(12) United States Patent
Leather et al.

(10) Patent No.: US 8,156,314 B2
(45) Date of Patent: Apr. 10, 2012

(54) INCREMENTAL STATE UPDATES

(75) Inventors: Mark M. Leather, Los Gatos, CA (US); Brian D. Emberling, Palo Alto, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 770 days.

(21) Appl. No.: 11/924,391

(22) Filed: Oct. 25, 2007

(65) Prior Publication Data

US 2009/0276563 A1 Nov. 5, 2009

(51) Int. Cl.
  *G06F 9/312* (2006.01)
  *G06F 12/00* (2006.01)

(52) U.S. Cl. .................. 712/225; 711/109; 345/559

(58) Field of Classification Search .................. None
  See application file for complete search history.

(56) References Cited

U.S. PATENT DOCUMENTS

| 7,617,497 | B1 * | 11/2009 | Nadkarni | 718/102 |
| 2007/0198978 | A1 * | 8/2007 | Dice et al. | 718/100 |
| 2007/0282790 | A1 * | 12/2007 | Goulko et al. | 707/2 |

* cited by examiner

*Primary Examiner* — Gary Portka
(74) *Attorney, Agent, or Firm* — Volpe and Koenig, P.C.

(57) ABSTRACT

A system and method are described that manage incremental state updates in such a way that multiple threads within a processor can each operate, in effect, on their own set of state data. The system and method are applicable to any processor in which multiple threads require access to sets of state information which differ from one another by a relatively small number of state changes.

14 Claims, 6 Drawing Sheets

State of time stamp manager:

Incoming work requests:

INCREMENTAL STATE UPDATES

TECHNICAL FIELD

The disclosure is generally related to computer architecture. In particular it is related to systems and methods for efficiently managing incremental state updates.

BACKGROUND

A graphics processing unit (GPU) is a processor chip that is dedicated to performing the calculations necessary to render graphics objects on a computer display. The GPU may be a dedicated device, several devices or integrated into a larger device (e.g., a north bridge device or a CPU). A common workflow inside a GPU involves updating the values of constants in a memory array and then performing a draw operation using the constants as data. A GPU whose memory array contains a given set of constants may be considered to be in a particular "state".

In graphics processing chips it is common to set up the state of the chip, perform a draw operation, and then make only a small number of changes to the state before the next draw operation. Most of the state settings, e.g. values of constants in memory, remain the same from one draw operation to the next.

In a typical GPU there is long latency in the graphics pipeline. A draw operation must wait many processor clock cycles for data to be fetched from memory. It is inefficient to leave the processor idle during this time. A better use of processor resources is to have several draw operations in process at the same time, each operating on its own state setting. Potentially dozens, or even hundreds, of draw operations, each needing its own state setting, might be running in a GPU at any given time.

One way to enable simultaneous processing of multiple draw operations is to provide multiple copies of all state registers. That way each draw operation can operate on its own copy of the chip state without waiting for earlier operations to finish. This solution is expensive in terms of chip real estate, however. The die size increases quickly as more and more copies of the memory are required. Updating the data within all the copies is also time consuming.

What are needed are systems and methods for efficiently managing incremental state updates in a processor.

BRIEF DESCRIPTION OF THE DRAWINGS

The drawings are heuristic for clarity.

DETAILED DESCRIPTION

A system and method for efficiently managing incremental state updates in a processor are described herein. The description is cast in terms applicable to a graphics processor; however, it will become clear that the system and method are applicable to any processor in which multiple threads require access to sets of state information which differ from one another by only a relatively small number of state changes.

Figure 1:
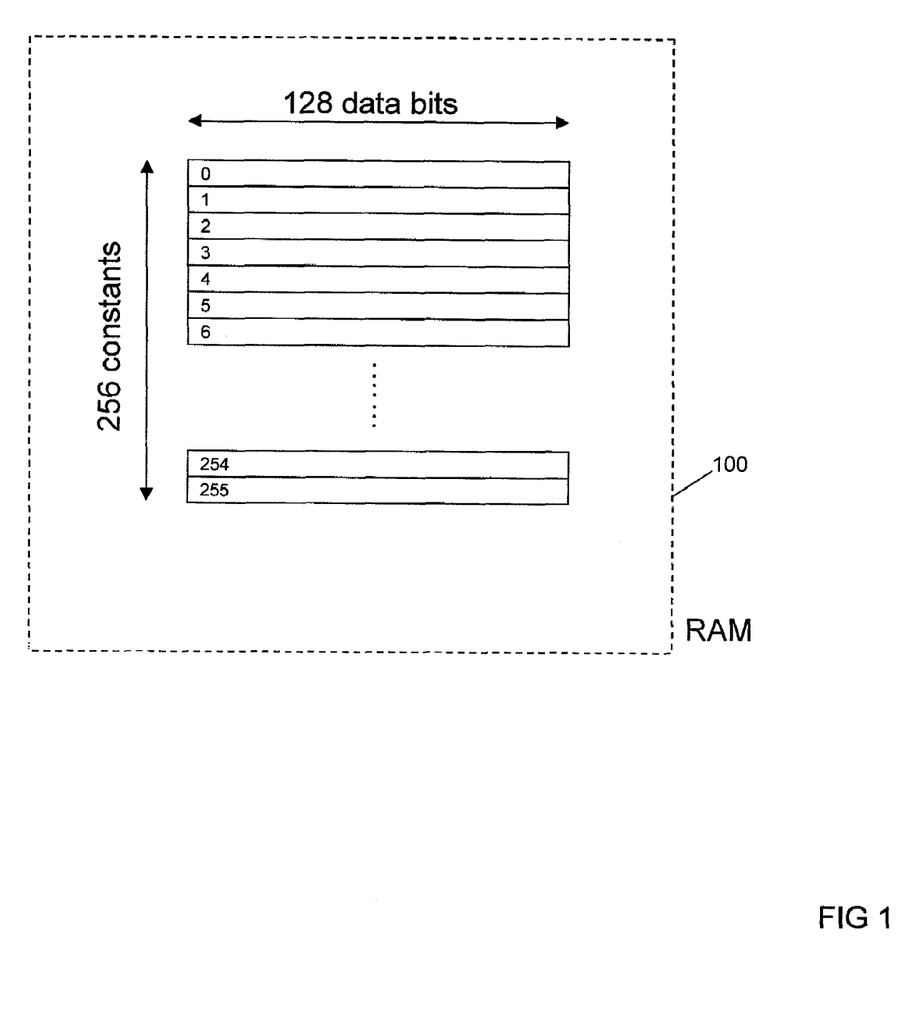
FIG. 1 is a schematic diagram of a random access memory.

FIG. 1 is a schematic diagram of a random access memory (RAM) 100. In this example the RAM contains 256 constants each of which comprises 128 data bits. Suppose that the RAM is part of a GPU and that multiple draw operations are waiting to be performed by the GPU. Each draw operation operates on the set of data currently stored in the RAM. If only one copy of the RAM exists, each draw operation has to wait for the previous operation to finish. The values of the constants may then be updated between draw operations.

In graphics processors the set of data required by one draw operation is often not very different from that required by the next draw operation. For example, often only a few constants in RAM are updated between draw operations. The system and method described herein take advantage of this property to create an efficient system for managing these incremental updates such that multiple operations can be processed at once.

Figure 2:
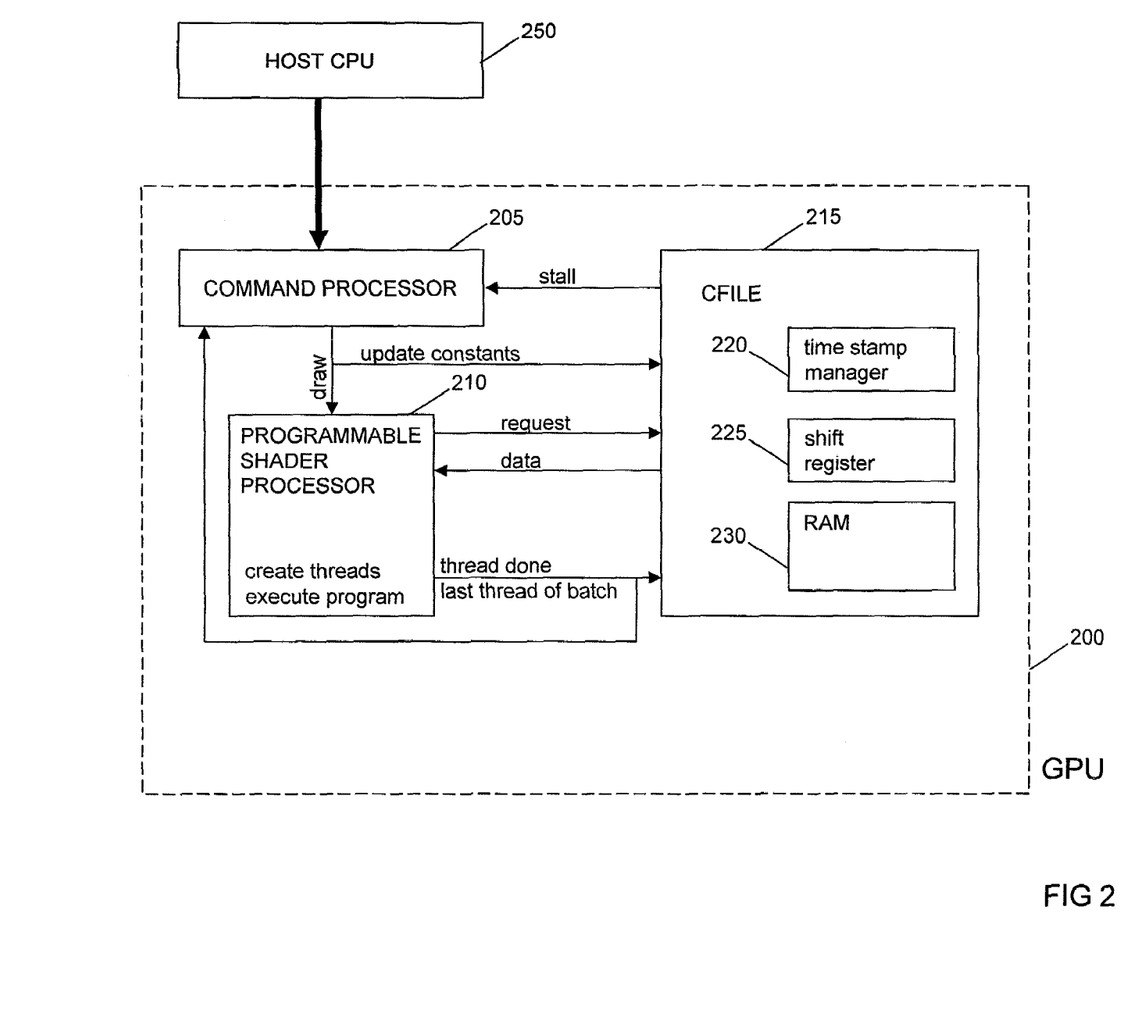
FIG. 2 shows a graphics processing unit comprising various functional blocks.

FIG. 2 shows a graphics processing unit comprising various functional blocks. GPU 200 comprises command processor 205, programmable shader processor 210 and a CFILE 215. ("CFILE" is shorthand for "constant file".) An actual GPU also comprises many other blocks and subsystems that have been omitted from FIG. 2 for simplicity. Within CFILE 215 are time stamp manager 220, shift register 225, and RAM 230. GPU 200 communicates and may be incorporated with host CPU 250. RAM 230 in FIG. 2 is a memory such as RAM 100 in FIG. 1.

In typical operation the CPU, running a driver program, writes commands into a memory buffer and these commands are executed by the command processor. The command processor initiates a draw operation by sending a set of updates to constants to the CFILE and sending a draw command to the programmable shader processor. The shader processor creates threads and executes a drawing program. (The shader processor is but one example of a programmable processor. Any programmable processor running threads that access constants in the CFILE may benefit from the systems and methods described herein.)

The threads created by the shader processor operate with constant data stored in the CFILE. When a thread needs data it sends a request for that data to the CFILE; the CFILE supplies the necessary data to the thread. The CFILE can accommodate data requests from more than one thread at a time. If too many threads request data from the CFILE and the CFILE cannot accommodate the requests, it sends a stall signal to the command processor. Finally when threads finish, the shader processor sends a thread done signal and the identification of the last thread in a batch to both the CFILE and the command processor.

The CFILE is the unit within the GPU that manages incremental state updates in such a way that multiple threads within the GPU can each operate, in effect, on their own set of state data.

Figure 3:
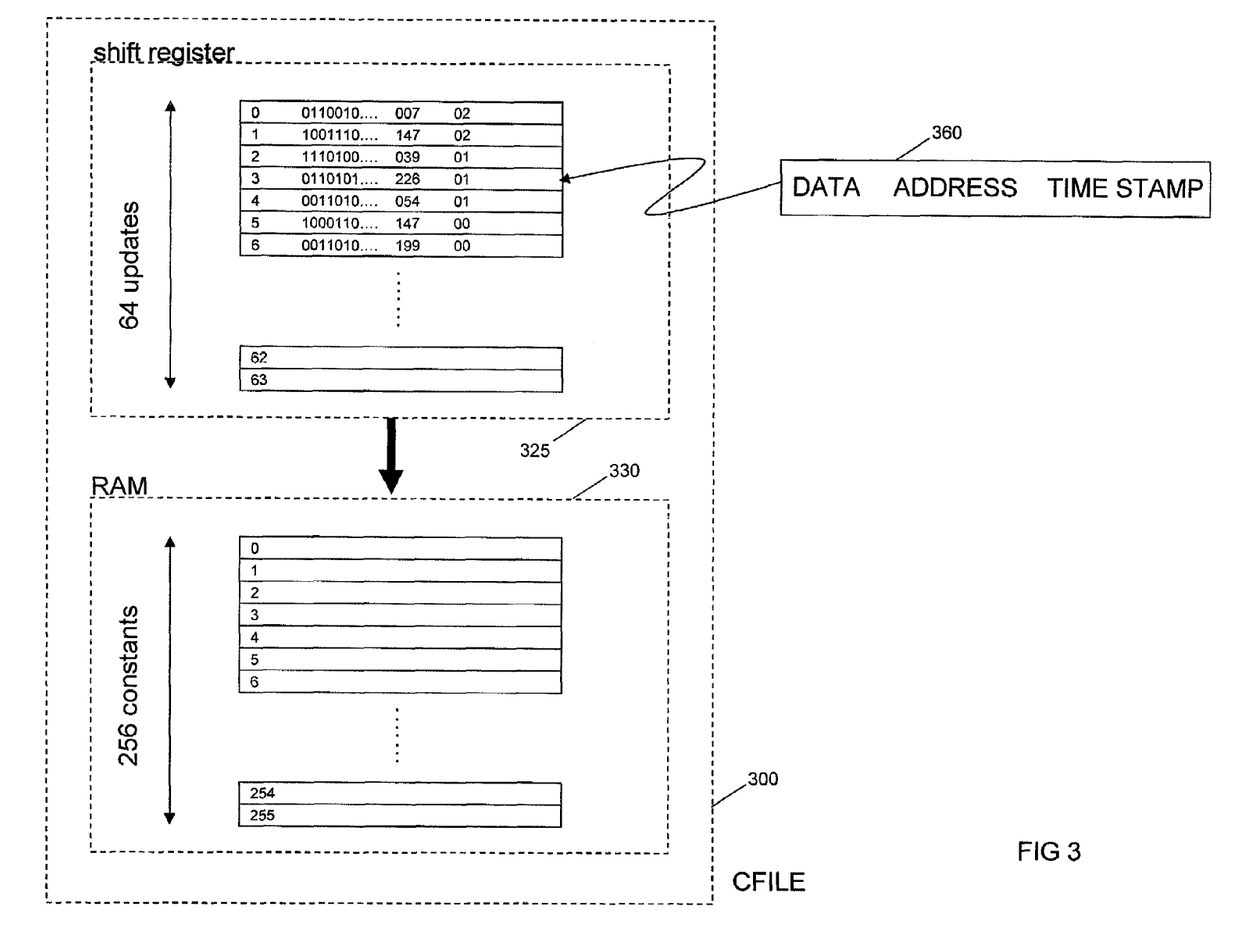
FIG. 3 is a schematic diagram of a shift register and a RAM within a CFILE.

FIG. 3 is a schematic diagram of a shift register and a RAM within a CFILE. In FIG. 3, CFILE 300 corresponds to the same element identified as item 215 in FIG. 2. Similarly, RAM 330 and shift register 325 correspond to RAM 230 and shift register 225 in FIG. 2.

In FIG. 3 shift register 325 contains 64 addresses while RAM 330 contains 256 addresses. The numbers of addresses within these two structures are matters of engineering convenience and do not affect the manner in which the CFILE operates.

The shift register holds updates to the constants stored in the RAM. Each address in the RAM holds a constant, for example a 128 bit number. Each address in the shift register holds a constant plus an address of a memory location in the RAM and a time stamp as called out in item 360. In the exemplary embodiment, larger values of a time stamp denote a later-in-time update. As an example, in FIG. 3, address 3 in shift register 325 contains a constant beginning with bits 0110101, RAM address226 and time stamp 01.

Consider now an example of CFILE operation. Suppose at time 0 the command processor issues an update/draw command; i.e. the command processor sends updates to constants to the CFILE and a draw command to the shader processor. Suppose further that one of the constants updated is the one corresponding to address 147 of RAM and that the shader processor initiates several threads to execute the draw operation. Each of the threads carries time stamp 0.

Instead of writing the updated constant value to address 147 of RAM, the CFILE writes the value to the shift register along with the address (147) and time stamp (0) information. As other update/draw commands are issued by the command processor, updated constants are written to the shift register with their corresponding RAM addresses and time stamps. Newer updates push older updates toward higher addresses in the shift register. The oldest updates drain into the RAM.

Now suppose that one of the threads from the time 0 draw operation needs to access the value of the constant stored in RAM address 147. The thread first checks the shift register to see if there are any updates corresponding to the address (147) it needs. If there are not any updates with the corresponding address, the thread uses the value stored in the RAM at the desired address. If, however, there are updates in the shift register with the corresponding address, then the thread uses the one of those updates that has the most recent time stamp that is not later than the thread's time stamp.

In FIG. 3, there are two updates, in shift register addresses 1 and 5, which are updates to RAM address 147. If a time 0 thread needs the value of the constant stored in RAM address 147, it uses the update with the most recent time stamp that is not later than time 0. In this example, the thread uses the update stored in shift register address 5. The update in shift register address 1 also contains an update to RAM address 147, but that update has a time stamp later (02) than that of the thread with time stamp 0. Therefore that update is too late for use by the thread with time stamp 0.

In this way, the shift register provides threads with the state of the GPU (i.e. constants stored in the RAM) that existed at the time the threads were created. Threads access constants stored in RAM if those constants have not been updated since the thread was created. The shift register provides updated constants to threads based on the time stamps of the threads and the constants.

The shift register cannot accumulate updates indefinitely as it only contains a finite number of addresses. In FIG. 3 the shift register is illustrated as containing 64 addresses as an example. Consider now a second example of CFILE operation. Suppose that at time 0 a first update/draw operation sends to the CFILE updates to all 256 constants in the RAM illustrated in FIG. 3. In response, the CFILE writes 64 of the constants in the shift register, each with its corresponding RAM address and time stamp 0. The other 192 constants (256−64=192) are stored in RAM. The shader processor starts several new threads, each with time stamp 0.

Now suppose that at a later time, e.g. time 1, a second update/draw operation sends to the CFILE updates to 64 constants. In response, the CFILE writes the 64 constants left in the shift register from the previous operation to RAM and stores the 64 new constant updates in the shift register, each with its corresponding RAM address and time stamp 1. The shader processor starts several new threads, each with time stamp 1.

The CFILE is now full. No new updates can be accommodated. The CFILE sends a stall signal to the command processor as shown in FIG. 2. The CFILE must wait for the time 0 threads to finish before freeing space in the shift register by writing time 1 updates to RAM. Otherwise, time 0 constants needed by time 0 threads could be overwritten and lost. Once time 0 threads are finished, however, constants in RAM may be updated by time 1 updates. Accounting for the number of new updates and sending stall signals sent from the CFILE to the command processor when necessary are accomplished by the time stamp manager.

Figure 4:
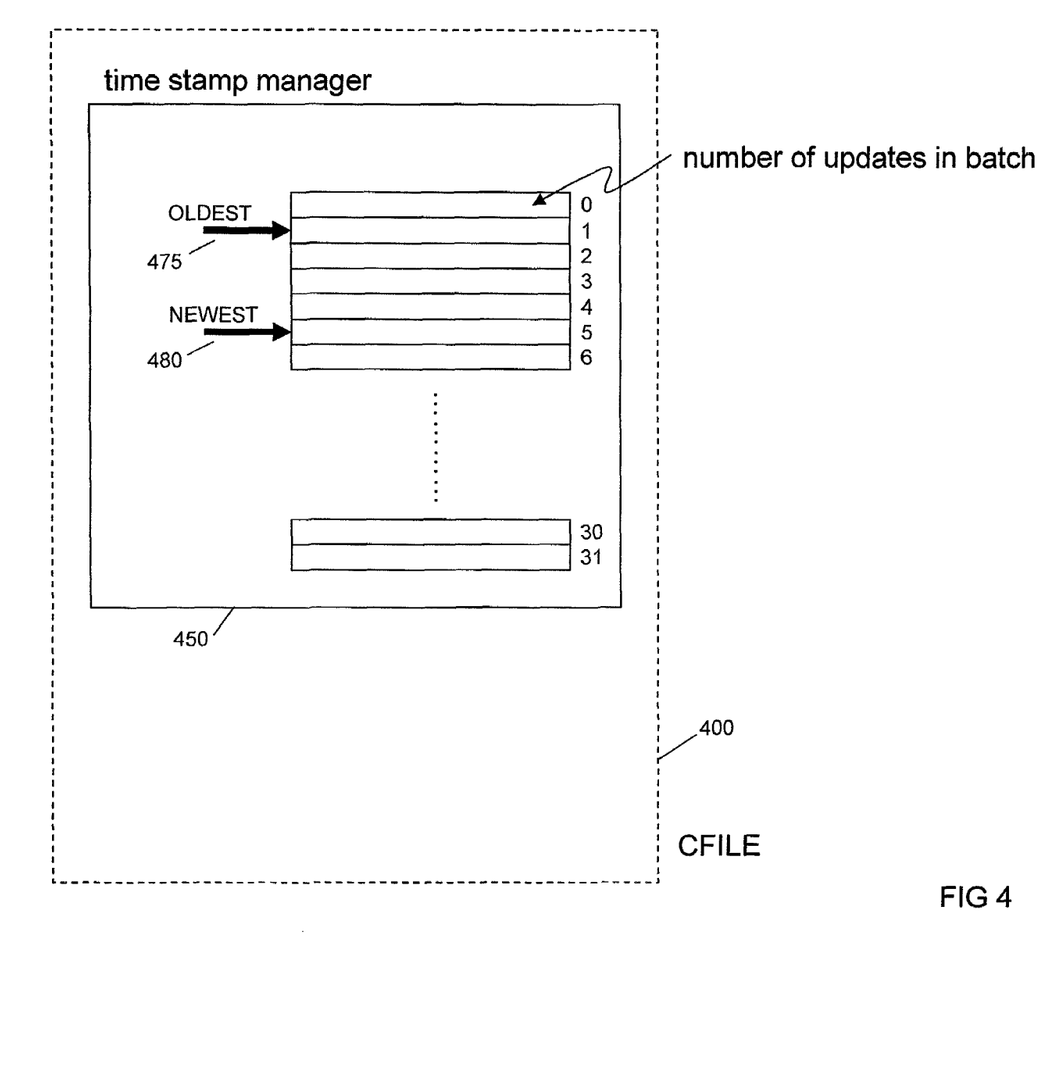
FIG. 4 is a schematic diagram of a time stamp manager within a CFILE.

FIG. 4 is a schematic diagram of a time stamp manager within a CFILE. In FIG. 4, CFILE 400 contains time stamp manager 450. In FIG. 4, CFILE 400 corresponds to the same element identified as item 215 in FIG. 2. Put another way, CFILE 215 contains both a shift register and a RAM as shown in FIG. 3, and a time stamp manager as shown in FIG. 4. The time stamp manager contains a number of memory addresses; in FIG. 4 the time stamp manager is illustrated as containing 32 memory addresses, however the number of memory addresses is a matter of engineering convenience: it does not affect the manner in which the time stamp manager operates. The time stamp manager maintains pointers 475 and 480 which keep track of the oldest and newest batches of updates respectively.

FIGS. 5A-5F illustrate an example of how a time stamp manager responds to incoming work requests. In FIGS. 5A-5F, work requests or commands from the command processor are listed on the left side of each illustration while the state of the time stamp manager is shown on the right.

Figure 5A:
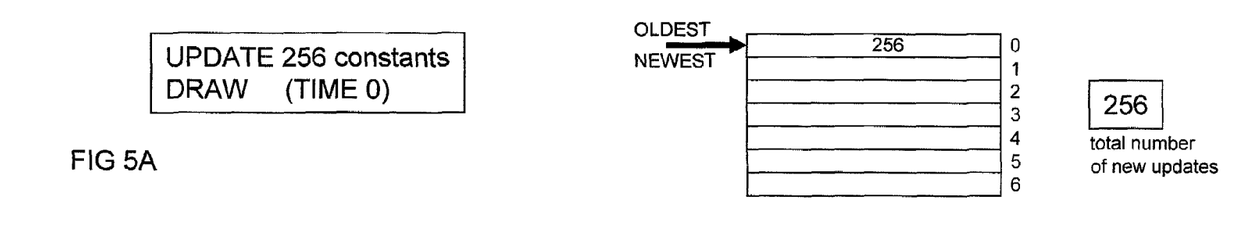
FIGS. 5A-5F illustrate an example of how a time stamp manager responds to incoming work requests.
Figure 5B:
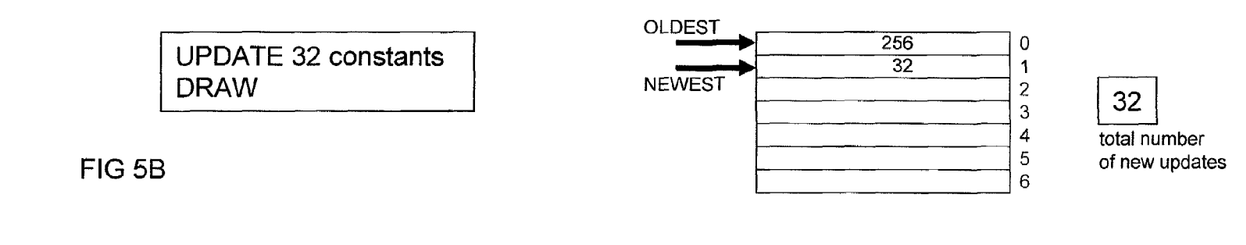

FIG. 5A illustrates the state of the time stamp manager just after the command processor has sent to the CFILE updates to all 256 constants at time 0. The time stamp manager writes the number of updates (256) in the batch into its memory address 0 and sets both the oldest and newest pointers to point at that address. Next, FIG. 5B shows what happens in the time stamp manager when the command processor subsequently sends to the CFILE 32 more updates to constants. The time stamp manager writes the number of updates (32) in the batch into its memory address 1 and sets the newest pointer to point at that address. The oldest pointer remains set to memory address 0. The total number of new updates is 32.

Figure 5C:
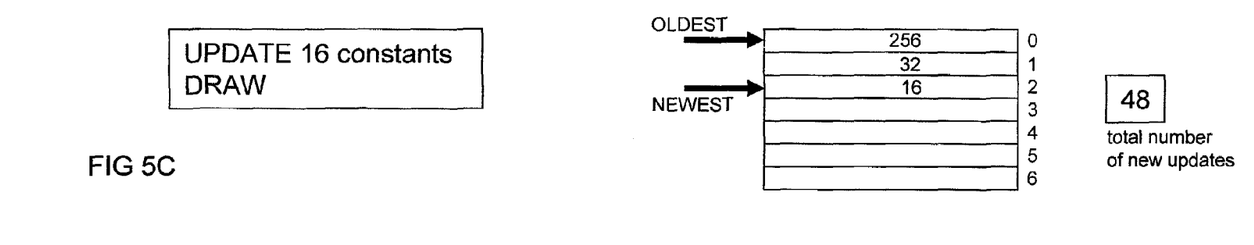

Next, FIG. 5C shows what happens in the time stamp manager when the command processor subsequently sends to the CFILE 16 more updates to constants. The time stamp manager writes the number of updates (16) in the batch into its memory address 2 and sets the newest pointer to point at that address. The oldest pointer remains set to memory address 0. The total number of new updates is 32+16=48.

Figure 5D:
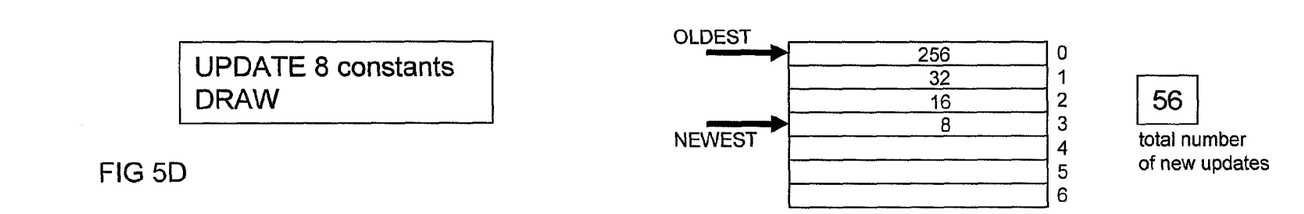

Next, FIG. 5D shows what happens in the time stamp manager when the command processor subsequently sends to the CFILE 8 more updates to constants. The time stamp manager writes the number of updates (8) in the batch into its memory address 3 and sets the newest pointer to point at that address. The oldest pointer remains set to memory address 0. The total number of new updates is 32+16+8=56.

Figure 5E:
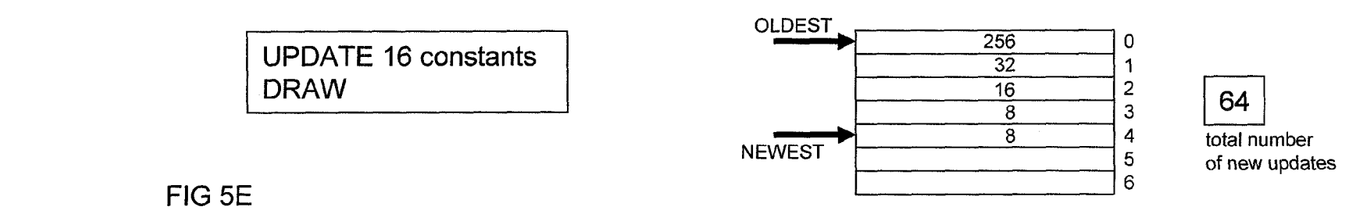

Next, FIG. 5E shows what happens in the time stamp manager when the command processor subsequently sends to the CFILE 16 more updates to constants. This time the time stamp manager writes only the number of updates (8) that are accommodated by the CFILE shift register into time stamp manager memory address 4 and sets the newest pointer to point at that address. The oldest pointer remains set to memory address 0. The total number of new updates is 32+16+8+8=64. 8 out of 16 requested updates are accommodated by the CFILE. The other 8 must wait as there is no room available for them in the shift register. (In this example the shift register holds only 64 updates.) The time stamp manager sends a stall signal to the command processor.

Figure 5F:
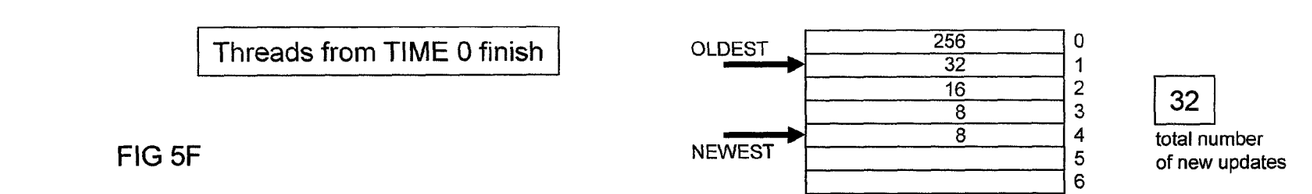

Next, FIG. 5F shows what happens in the time stamp manager when all time 0 threads finish. At this point there is no further need to protect time 0 constants. The time stamp manager moves the oldest pointer from address 0 to address 1. The oldest 32 (i.e. the number in the time stamp manager address pointed at the by the oldest pointer) updates in the shift register may now be written to RAM as no still-existing thread will ever need constants older than they are.

The CFILE is now ready for more updates, including for example, the 8 updates which had to wait in FIG. 5E. At this point the greatest number of new updates that the CFILE can accommodate with no further thread completions is 32 as the maximum number of new updates is 64 and 32 (16+8+8=32) new updates already exist.

To reiterate, the batch of updates pointed to by the oldest pointer is permitted to overwrite constants in RAM as no thread ever needs older constants. The total number of new updates is equal to the sum of the number of updates in the batches from one newer than the oldest, through the newest.

A stall condition is created whenever the number of new updates reaches the number of addresses in the shift register. A stall condition is also created when the number of batches of updates reaches the number of memory addresses in the time stamp manager. If the time stamp manager has 32 memory addresses, it can only keep track of 32 batches of updates. Although this example used a time stamp manager having 32 memory addresses, a recent implementation used a time stamp manager having 64 memory addresses. The number of memory addresses used is a matter of engineering convenience.

In the description above, threads and updates are tagged by time stamp. However, the value of a time stamp in system clock units may be a relatively large number. In some implementations it may be simpler to keep track of the ages of threads and updates. Age is calculated as the difference between the system clock at the time the thread or update was created and the current system clock. Age is often a smaller number than time stamp and therefore may be an easier quantity to manipulate. The operation of the systems and methods described herein is not significantly changed by the choice of age or time stamp.

In the description above, the shift register is positioned before the RAM; i.e. updates are first written to the shift register and then drained to the RAM. However, the system and method described herein could just as easily be implemented with the most recently updated version of the state stored in the RAM and progressively older updates stored in the shift register (or other overflow buffer).

Furthermore, the shift register (or other overflow buffer, FIFO, etc) could also be implemented as sets of age pointers. The system could be maintained with pointers and never move data around in RAM at all, but simply update pointers (age, address pairs) to locate the proper data. In this implementation the overflow buffer is virtualized in pointers.

Aspects of the invention described above may be implemented as functionality programmed into any of a variety of circuitry, including but not limited to electrically programmable logic and memory devices as well as application specific integrated circuits (ASICs) and fully custom integrated circuits. Some other possibilities for implementing aspects of the invention include: microcontrollers with memory (such as electronically erasable programmable read only memory (EEPROM)), embedded microprocessors, firmware, software, etc. The software could be hardware description language (HDL) such as Verilog and the like, that when processed is used to manufacture a processor capable of performing the above described functionality. Furthermore, aspects of the invention may be embodied in microprocessors having software-based circuit emulation, discrete logic (sequential and combinatorial), custom devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

As one skilled in the art will readily appreciate from the disclosure of the embodiments herein, processes, machines, manufacture, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, means, methods, or steps.

The above description of illustrated embodiments of the systems and methods is not intended to be exhaustive or to limit the systems and methods to the precise form disclosed. While specific embodiments of, and examples for, the systems and methods are described herein for illustrative purposes, various equivalent modifications are possible within the scope of the systems and methods, as those skilled in the relevant art will recognize. The teachings of the systems and methods provided herein can be applied to other systems and methods, not only for the systems and methods described above.

In general, in the following claims, the terms used should not be construed to limit the systems and methods to the specific embodiments disclosed in the specification and the claims, but should be construed to include all systems that operate under the claims. Accordingly, the systems and methods are not limited by the disclosure, but instead the scope of the systems and methods are to be determined entirely by the claims.

What is claimed is:

1. A method for managing incremental state updates to data in a processor, the processor including a register and a memory, the register configured to store entries, each entry including a data value, an address corresponding to a memory address, and a data time stamp, the processor configured to execute one or more threads, each thread having a thread time stamp, the method comprising:
   checking the register for an entry corresponding to a memory address;
   if there is no entry in the register corresponding to the memory address, then retrieving a data value from the memory address;
   if there is an entry in the register corresponding to the memory address, retrieving a data value from the entry in the register corresponding to the memory address only if the data time stamp of the data value is earlier than the thread time stamp; and
   executing the thread with the retrieved data value.

2. The method according to claim 1, further comprising:
   storing updates to data in the register, each update to data including a data value, an address corresponding to a memory address, and a data time stamp corresponding to a time when the update to data is stored.

3. The method according to claim 2, further comprising:
if the register is full, sending a stall signal to prevent the register from being overwritten by new entries until all earlier time stamped threads complete execution.

4. A processor for managing incremental state updates to data, comprising:
a memory; and
a register in communication with the memory, the register configured to store entries, each entry including a data value, an address corresponding to a memory address, and a data time stamp;
wherein the processor is configured to:
check the register for an entry corresponding to a memory address;
if there is no entry in the register corresponding to the memory address, then retrieve a data value from the memory address;
if there is an entry in the register corresponding to the memory address, retrieve a data value from the entry in the register corresponding to the memory address only if the data time stamp of the data value is earlier than a thread time stamp; and
execute the thread with the retrieved data value.

5. The processor according to claim 4, wherein the processor is further configured to:
store updates to data in the register, each update to data including a data value, an address corresponding to a memory address, and a data time stamp corresponding to a time when the update to data is stored.

6. The processor according to claim 5, wherein if the register is full, the processor is further configured to:
send a stall signal to prevent the register from being overwritten by new entries until all earlier time stamped threads complete execution.

7. The processor according to claim 4, further comprising:
a time stamp manager in communication with the register, the time stamp manager configured to keep track of which thread time stamp is an oldest and which thread time stamp is a newest.

8. A processor for managing incremental state updates to data, comprising:
a constant file, including a memory and a register in communication with the memory, the register configured to store entries, each entry including a data value, an address corresponding to a memory address, and a data time stamp;
a command processor in communication with the constant file, the command processor configured to update data in the constant file by storing updates to data in the register, each update to data including a data value, an address corresponding to a memory address, and a data time stamp corresponding to a time when the update to data is stored; and
a programmable processor in communication with the constant file and the command processor, the programmable processor configured to:
check the register for an entry corresponding to a memory address;
if there is no entry in the register corresponding to the memory address, then retrieve a data value from the memory address;
if there is an entry in the register corresponding to the memory address, retrieve a data value from the entry in the register corresponding to the memory address only if the data time stamp of the data value is earlier than a thread time stamp; and
execute the thread with the retrieved data value.

9. The processor according to claim 8, wherein:
the command processor is further configured to send a command to the programmable processor; and
the programmable processor is further configured to create one or more threads to execute the command.

10. The processor according to claim 8, wherein if the register is full, the constant file is configured to send a stall command to the command processor such that the command processor stalls all newer threads from executing until all earlier time stamped threads complete executing.

11. The processor according to claim 10, wherein the programmable processor is further configured to send a completion signal to the constant file when all of the threads having a same thread time stamp have completed executing.

12. The processor according to claim 8, wherein the constant file further includes a time stamp manager in communication with the register, the time stamp manager configured to keep track of which thread time stamp is an oldest and which thread time stamp is a newest.

13. A computer-readable storage medium storing a set of instructions for execution by one or more processors to facilitate manufacture of a processor for managing incremental state updates to data, the processor comprising:
a constant file, including a memory and a register in communication with the memory, the register configured to store entries, each entry including a data value, an address corresponding to a memory address, and a data time stamp;
a command processor in communication with the constant file, the command processor configured to update data in the constant file by storing updates to data in the register, each update to data including a data value, an address corresponding to a memory address, and a data time stamp corresponding to a time when the update to data is stored; and
a programmable processor in communication with the constant file and the command processor, the programmable processor configured to:
check the register for an entry corresponding to a memory address;
if there is no entry in the register corresponding to the memory address, then retrieve a data value from the memory address;
if there is an entry in the register corresponding to the memory address, retrieve a data value from the entry in the register corresponding to the memory address only if the data time stamp of the data value is earlier than a thread time stamp; and
execute the thread with the retrieved data value.

14. The computer-readable storage medium of claim 13, wherein the instructions are hardware description language (HDL) instructions used for the manufacture of a device.

* * * * *